UNITED STATES PATENT OFFICE.

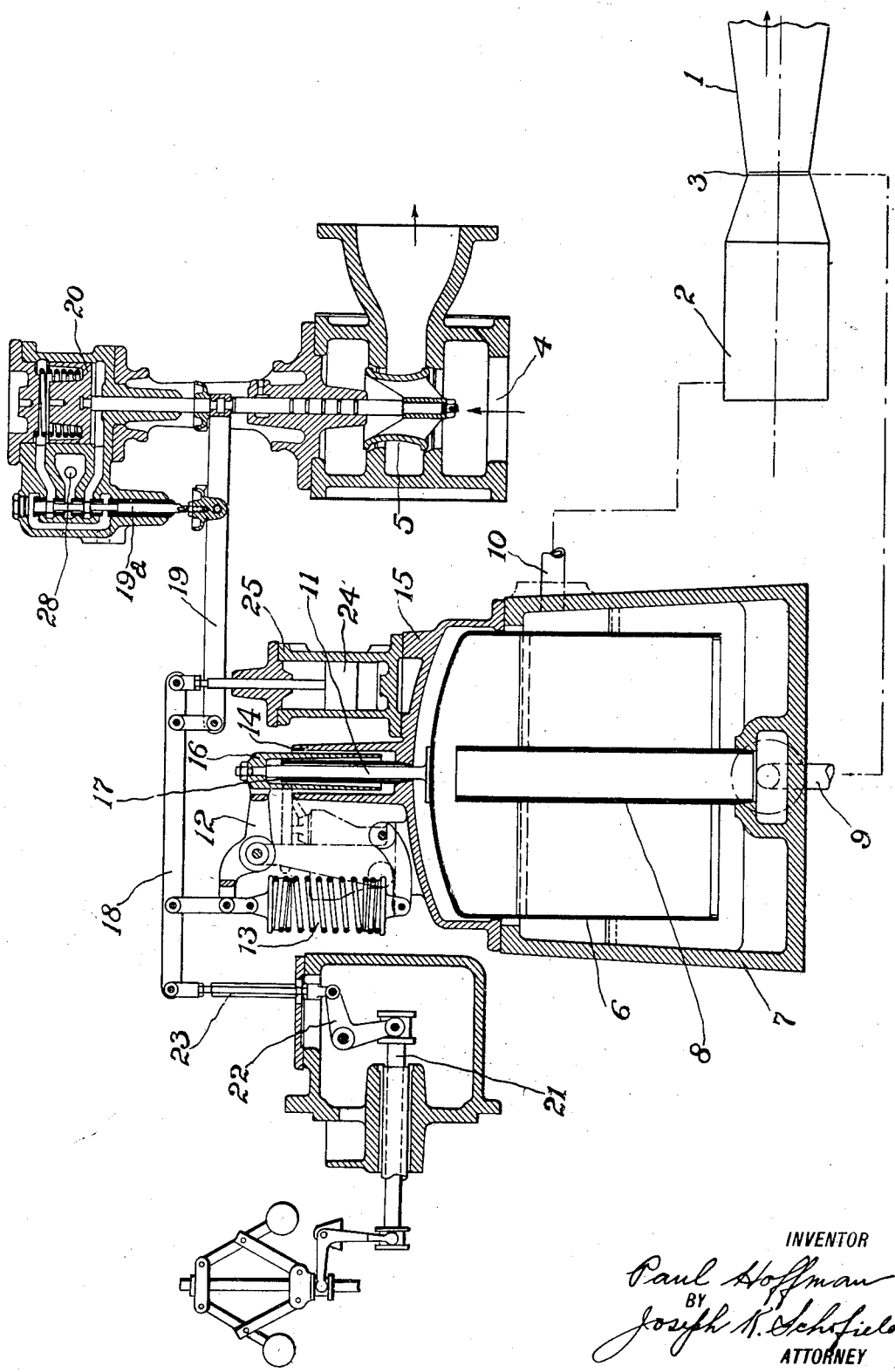

PAUL HOFFMAN, OF EASTON, PENNSYLVANIA, ASSIGNOR TO INGERSOLL-RAND COMPANY, OF JERSEY CITY, NEW JERSEY, A CORPORATION OF NEW JERSEY.

CONSTANT-VOLUME REGULATOR FOR TURBO-COMPRESSORS.

1,383,258.  Specification of Letters Patent.  Patented June 28, 1921.

Application filed August 30, 1919. Serial No. 320,911.

*To all whom it may concern:*

Be it known that I, PAUL HOFFMAN, a citizen of the United States, residing at Easton, in the county of Northampton and State of Pennsylvania, have invented a certain new and useful Improvement in Constant-Volume Regulators for Turbo-Compressors, of which the following is a specification.

This invention relates to turbo compressors, and in particular to a regulator for a compressor of this type adapted to deliver a constant quantity of fluid against varying pressures.

In installations of blast furnaces it is desired to furnish a constant volume of air when measured at atmospheric pressure and temperature, necessary to produce the metallurgical changes desired. During the operation of a blast furnace, its internal condition and, therefore, its resistance to the passage of the air varies, so that it is necessary to provide some form of regulator which will force a constant volume of free air into the furnace. It is for installations of the above type that the regulator made in accordance with the present invention is especially designed.

For the above purpose advantage is taken of the variations in pressure within a Venturi tube forming the intake conduit of the turbo compressor. It is well known that with a fluid passing through a Venturi tube the difference in pressure between the full diametered portion and the throat or restricted portion, varies with the square of the velocity and consequently varies as the square of the quantity of fluid passing through the Venturi tube. If, then, the difference in pressure between these parts of the intake is maintained constant, we know that the velocity through the intake and consequently the quantity of air entering the compressor is constant.

An object of the present invention is, therefore, to provide a regulator utilizing this action of a Venturi tube to vary the motive fluid supplied to the motor driving the turbo compressor so as to maintain a constant quantity of fluid—usually air—passing through the compressor supplying the blast furnaces or other installations requiring a constant quantity of air against different pressures above or below normal.

A further object of the invention is to provide a governor sensitive enough to react upon very slight variation of the velocity-head at the Venturi throat and to bring about such change in the speed of the compressor as will maintain a constant quantity of free air in spite of variation in pressure.

With these and other objects in view my invention consists in the features of construction and operation set forth in the following specification:

In the figure of the drawing annexed hereto and forming a part of the specification, a cross sectional view of a complete regulator is shown adapted to operate as above described.

It is a characteristic of turbo-compressors that if maintained at a constant speed the volume will vary inversely with the pressure, so that when the pressure against which the turbo-compressor is operating is increased the amount of fluid compressed is diminished, and vice versa. If then a constant quantity of fluid is to be compressed against different or variable pressures the governor or regulator must act to increase the speed of the compressor to maintain the same quantity going through the compressor against the increased pressure. Similarly, when the pressure against which the compressor is operating is lowered the speed must be reduced to prevent an increased quantity of fluid being compressed.

Referring now more particularly to the drawing, the intake of a turbo-compressor is shown at 1, which is formed as a Venturi tube having a full diametered portion 2 at which the air or other fluid enters and a throat 3 at which the velocity of the incoming fluid is greatest. As is well known, the static pressure of the fluid at the throat 3 is less than that at the full diametered portions of the venturi, the difference in the pressure at the throat from that at the full diametered portions varying with the square of the velocity and consequently with the square of the quantity passing through the venturi.

At 4 is shown the main fluid supply conduit for admitting motive fluid to operate the motor for the compressor, and at 5 is shown a throttle valve in this conduit 4 for varying the amount of motive fluid supplied to the motor to maintain a constant flow of air being compressed through the compressor at varying pressures dependent upon the condition of the blast furnace or other apparatus being supplied with a constant volume of air or other gas. To operate the valve 5 a bellshaped float 6 is provided suitably mounted to slide vertically within a receptacle 7 having a certain amount of water or other suitable liquid to seal the lower end of this bellshaped float. A pipe or other conduit 8 extends up within the receptacle 7 and within the bell shaped float 6 to a point near its top above the level of the water seal when in operation. This pipe 8 at its lower end is connected with a conduit 9 which is in communication with the throat 3 of the Venturi intake tube of the compressor, as shown diagrammatically in the drawing.

At one side of the receptacle 7 at a point above the water level is a conduit 10 suitably connected with the full diameter portion 2 of the Venturi intake of the compressor so that a difference in pressure will be produced in the conduits 9 and 10 when fluid is passing through the intake of the compressor, but differences in pressure within conduits 9 and 10 will produce pressure differences between inside and outside of float 6 and thus tend to unbalance the position of this float 6.

Attached to the top surface of the bell shaped float 6 is a stem 11 to which is attached a bell crank lever 12, the opposite end of the lever 12 having an adjustable spring 13 to balance the pressure difference between the inside and outside of the float 6, and also its weight. The connection between the bell shaped float 6 and the lever 12 includes a water seal comprising an annular extension 14 to the top casing 15 and, surrounding the stem 11, an annular body 16 and also a pipe 17 made fast into the top casing 15. Within the spaces between these parts water or other suitable liquid is placed. It will thus be seen that movement of the float 6 will be without material friction other than that produced by the viscosity of the water seals.

The pressure difference necessary to maintain the float 6 at a given position is dependent upon the tension of spring 13, which pressure difference as above indicated, will vary with differences in velocity of fluid through the Venturi intake. In connection with the lever 12 is a series of levers or linkages 18 and 19 through which the movement of the float 6 operates a pilot valve 19ª and through this pilot valve operates a piston 20 directly connected with the valve 5. The first effect of a movement of the linkage system 18 and 19 is therefore to vary the position of this pilot valve 19ª, which, through connection with a source of fluid supply 28 forces fluid either above or below the piston 20, thus causing the piston 20, and consequently, the valve 5, to vary its position.

The position of the pilot valve 19ª is adjustable and the whole relation in the various elements from float 6 to valve 5 is such that, for a given amount of fluid flowing through the venturi and a given tension of the spring 13, a certain amount of motive fluid is passed through valve 5 which will maintain the speed of the compressor constant. Any change in the volume of fluid passing through the venturi will result, through disturbance of the equilibrium existing in the regulator, in a change of the valve 5, consequently varying the speed of the motor until the former balance is reestablished and the volume through the venturi brought back to its original value.

Associated with the linkage members 18 and 19 is a suitable centrifugal governor shaft 21 which, operating through a bell crank lever 22 and distance piece 23 is attached at one extremity of the link 18. This speed governor shaft 21 is intended to remain fixed in its position until a given safe speed of the motor and compressor is exceeded, at which speed shaft 21 moves slightly to the left, thus raising one end of the link 18 and, through the link 19, closes the valve 5. This prevents a safe speed of the motor and compressor being exceeded but has no effect upon the regulation of the motor within the operable and safe speeds and within normal capacities of the compressor.

At the opposite end of the link 18 is a dash pot 24 designed to prevent violent fluctuations in the movement of the float 6 and thus of the valve 5 with resulting irregular hunting operation of the compressor. The dash pot 24 fits closely within its cylinder 25, but its resistance may be regulated by a bypass.

Briefly, the operation of the above regulator is as follows: In starting, with oil or other medium under pressure supplied through port 28 to below the piston 20, the valve 5 is held in open position and this position of the valve 5 is maintained until a velocity of fluid is attained in the intake 1 of the compressor corresponding to a constant volume of free air being supplied per minute. This velocity produces a definite difference in pressure between the throat 3 and the full diameter portion 2 of the intake and consequently a constant difference in elevation of the parts of the water seal inside and outside of the bell shaped float 6 which has the effect of unbalancing the float 6. The spring 13 is designed to counterbalance this condition produced by the weight of the float 6 so that variations in the tension of the spring 13 provide means for varying the volume of air admitted to the compressor for the reason that with a greater tension of spring 13 a greater difference in pressure must exist in the parts of the venturi and consequently the velocity through the venturi must be greater to overcome this increased spring tension. As soon as this definite pressure difference in the float 6 has been attained the float 6 is forced downwardly, without friction, thus varying the position of the linkage 18 and 19 and through the changing position of the pilot valve 19ª the fluid pressure is cut off from below the piston 20 and admitted to the portion above this piston, thus forcing the valve 5 toward closed position. Movement of the valve toward its closed position, however, has the effect of cutting off the supplying of fluid above the piston 20, therefore stopping the closing movement of the valve 5 until the linkage 18—19 has again moved in accordance with a further movement of the float 6. This continued movement of the float, the pilot valve and the throttle valve 5 is maintained until a point is reached at which the linkage 18 and 19 and float 6 are balanced. To increase the amount of fluid being compressed it is only necessary to increase the tension of spring 13 which will require a greater difference in pressure between the parts of the intake and consequently a higher velocity of the fluid entering the compressor.

During the operation of the compressor as soon as the resistance of the furnace or other apparatus being supplied is decreased the first effect is to increase the velocity of the compressor which will have the effect of increasing the fluid velocity through the intake of the compressor and consequently increasing the pressure difference holding the float 6, and thus forcing the float to move downwardly thus varying the position of the links 18—19 which through the operation of the pilot valve 19ª will force the valve 5 slowly into a new position decreasing the amount of fluid admitted to the compressor motor.

Similarly when the pressure against which the compressor is operating increases the position of the float 6 is raised and the valve 5 moves to a position to admit more fluid to the motor to increase its speed.

Having thus described my invention what I claim is:

1. A constant volume regulator for a motor driven turbo compressor, comprising a Venturi tube forming the intake of the compressor, a float, movement of which is adapted to vary the amount of power to drive the motor of said turbo compressor, said float being forced up or down by fluctuations in pressure differences between the throat and full diametered portions of said Venturi intake tube, whereby a substantially constant quantity of fluid is delivered to the intake of the turbo compressor regardless of the discharge pressure.

2. A constant volume regulator for a motor driven turbo compressor, comprising an intake for said turbo compressor in the form of a Venturi tube, a receptacle, a bell shaped float inclosed within said receptacle, one side of said float being subjected to fluid pressure at the throat of said venturi and the other side to the pressure of the full diametered portion of said intake, whereby fluctuations in pressure difference between said two points in the intake will cause the float to move up or down to vary the amount of fluid supplied to the motor of said turbo compressor.

3. In a motor driven compressor, the combination of an intake conduit having a restricted portion, a bell shaped float movable up and down by variations in the difference in pressure above and below said float, and means connecting the space below said float to the restricted portion of said intake conduit, the space above said float being connected to a full diametered portion of said intake conduit.

4. In a motor driven turbo compressor, the combination of an intake conduit having a portion adapted to increase the velocity of the incoming fluid, a water sealed receptacle, a bell shaped float within said receptacle, means connecting the space within said float to a point in the intake conduit in which the velocity of the fluid is increased and means connecting the portion of the receptacle above the float with a portion of the intake conduit in which the velocity of the fluid is normal.

5. A regulator for a motor driven compressor, comprising a water sealed bell shaped float, movement of which varies the power supplied to the motor to drive the compressor, an intake conduit for the compressor and means to vary the position of said float comprising conduits connecting the top and bottom of the float with different points in the intake of said compressor at which the pressure is different due to the velocity in the intake.

6. A regulator for a motor driven compressor, comprising a water sealed bell shaped float, movement of which varies the power supplied to the motor to drive the compressor, an intake conduit for the compressor, means to vary the position of said float comprising pressure conduits connecting the top and bottom of the float with different points in the intake of said compressor in which the static pressures are different due to the velocity in the intake.

7. A regulator for a motor driven compressor, comprising a water sealed bell shaped float, movement of which varies the power supplied to the motor to drive the compressor, an intake conduit for the compressor and differential means to vary the position of the said float comprising pressure conduits connecting the top and bottom of the float with different points in the intake of said compressor having different pressures due to the velocity in the intake.

8. A regulator for a motor driven compressor, a throttle valve for the motor, said regulator comprising a water sealed bell shaped float, movement of which varies the power supplied to the motor to drive the compressor, an intake conduit for the compressor conduit means connected to different points in spaced relation in the intake of said compressor at which the pressures are different due to the velocity in said intake to move said float, and linkage connecting the float with the said throttle valve, means for resisting the movement of the float and means for regulating said resistance whereby a constant volume of fluid may be compressed.

9. A constant volume regulator for a motor driven turbo-compressor, comprising an intake for said turbo-compressor in the form of a Venturi tube, a water sealed receptacle, a bell shaped float inclosed within said receptacle, one side of said float being subjected to fluid pressure at the throat of said Venturi tube and the other side being subjected to a constantly greater pressure, whereby fluctuations in pressure difference between the pressure on the said two sides of the float will cause the float to move up or down to vary the amount of fluid supplied to the motor of said turbo-compressor.

10. A constant volume regulator for a motor driven turbo-compressor, comprising an intake for said turbo-compressor in the form of a Venturi tube, a water sealed receptacle, a bell shaped float inclosed within said receptacle, and movable up and down by variations in the difference in pressure above and below said float, the space below the float being connected to the throat of said Venturi tube and subject to the variations in fluid pressure at said throat.

In testimony whereof I have hereunto set my hand.

PAUL HOFFMAN.